United States Patent [19]
Eads et al.

[11] 3,965,991
[45] June 29, 1976

[54] MANUAL CULTIVATING TOOL

[75] Inventors: Harold O. Eads, Parkersburg, W. Va.; James W. Robison, Belpre, Ohio

[73] Assignee: McDonough Co., Parkersburg, W. Va.

[22] Filed: July 14, 1975

[21] Appl. No.: 595,694

[52] U.S. Cl.................................. 172/376; 30/318; 403/375
[51] Int. Cl.²........................ A01B 1/10; A01B 1/22
[58] Field of Search ........... 172/371, 372, 375, 376, 172/377, 378, 380, 381; 403/107, 109, 363, 375; 30/279 A, 318, 320, 321; D8/1, 6, 7, 8, 9, 10, 11, 12, 13

[56] References Cited
UNITED STATES PATENTS

| | | | |
|---|---|---|---|
| 1,224,630 | 5/1917 | Gilson, Sr. | 172/372 |
| 1,245,354 | 11/1917 | Kirsch | 403/107 |
| 1,785,531 | 12/1930 | Roesch et al. | 172/375 |
| 1,942,557 | 1/1934 | Landa | 30/318 |
| 2,037,480 | 4/1936 | Nedbal | 172/376 |
| 2,741,969 | 4/1956 | Strecker | 172/372 |
| 2,943,690 | 7/1960 | Towt | 172/376 |
| 2,988,157 | 6/1961 | Lindstaedt | 172/376 |
| 3,522,850 | 8/1970 | Pede | 172/376 |

*Primary Examiner*—Richard T. Stouffer
*Attorney, Agent, or Firm*—Cushman, Darby & Cushman

[57] ABSTRACT

A manual cultivator tool including a handle, a U-shaped blade, a tubular member provided with spaced flattened end portions having similar intermediately disposed bends therein, and a pair of separate handle attaching elements assembled into a final construction in which the tubular member interengages with the free ends of the legs of the U-shaped blade to form a strong annular structure and the attaching elements provide for both connection with the handle and the annular structure in such a way as to effect a limited tilting movement of the horizontal earth penetrating blade portion of the annular structure.

9 Claims, 3 Drawing Figures

MANUAL CULTIVATING TOOL

This invention relates to cultivating tools and more particularly to an improved manual cultivator tool of the type having a U-shaped blade mounted on a handle for limited articulated movement.

Articulated manual cultivator tools of the type herein contemplated are well known having appeared in the patented literature as early as 1907 (see U.S. Pat. No. 841,708) and been produced and sold commercially for many years. Various constructions have been proposed and produced, examples of which are contained in the following U.S. Pat. Nos.: 1,167,491; 2,539,351; 2,943,690; and 2,988,157.

While the tools commercially available have proven acceptable in actual practice, there always exists the need to upgrade the durability characteristics of such tools while reducing production costs. It is an object of the present invention to provide an improved construction which will meet such needs. In accordance with the principles of the present invention, this objective is obtained by providing a tubular member with spaced flattened end portions having similar intermediately disposed bends therein which is used in conjunction with a U-shaped blade and a pair of separate handle attaching elements to provide for simple assembly of easily fabricated components into a final construction in which the tubular member interengages with the free ends of the legs of the U-shaped blade to form a strong annular structure and the attaching elements provide for both connection with the handle and the annular structure in such a way as to effect the limited tilting movement of the horizontal earth penetrating blade portion of the annular structure.

Other objects of the present invention will become more apparent during the course of the following detailed descripton and appended claims.

The invention may best be understood with reference to the accompanying drawings wherein an illustrative embodiment is shown.

Figure 1:
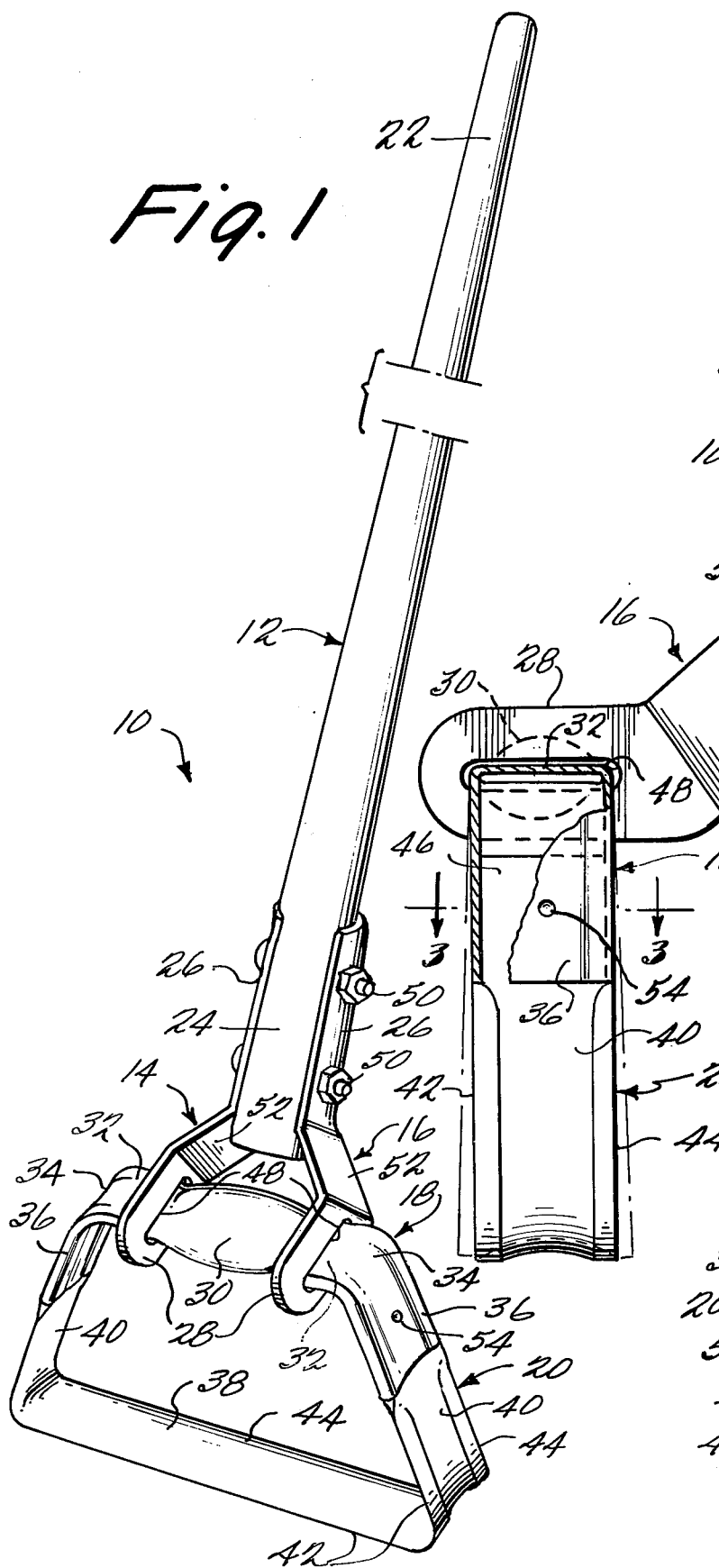
FIG. 1 is a perspective view of a cultivator tool embodying the principles of the present invention.

Referring now more particularly to the drawings, there is shown in FIG. 1 thereof a hand tool of the cultivator type, generally designated at 10, which embodies the principles of the present invention. The tool 10 consists essentially of a combination of five component parts which are identified as an elongated handle 12, a pair of separate handle attaching elements 14 and 16, a tubular member 18 and a U-shaped blade 20.

In the preferred embodiment shown, the handle 12 is formed of wood and has a simple elongated cylindrical configuration. The handle presents a manually engageable end portion 22 which is preferably rounded at its extremity in accordance with usual practice and an opposite end portion 24 to which the handle attaching elements 14 and 16 are affixed. It will be understood that the configuration and material of the handle may be varied as desired.

The pair of separate attaching elements 14 and 16 are preferably formed of strap metal and have configurations which bear a mirror image relationship to one another. With this relationship in mind, each handle attaching element includes a first portion 26 affixed to the handle end portion 24 and second portion 28 articulately interconnected with the tubular member 18.

The tubular member 18 is preferably formed from a metallic tube which has spaced opposite end portions thereof flattened and then intermediately bent in a transverse direction. This preferred construction thus provides a central tubular portion 30, opposed flattened portions 32 extending straight outwardly therefrom, transverse bends 34 and spaced angular extending flattened free end portions 36.

The U-shaped blade 20 includes the usual bight portion 38 and leg portions 40. The blade is preferably constructed of strap metal which is bent transversely into a concavo-convex cross-sectional configuration. Opposed longitudinal edge portions of the concave side are then ground along a common plane to form opposed cutting edges 42 and 44. The strap is then bent into its final U-shaped configuration at positions such that the cutting edges extend into the leg portions 40 adjacent the bight portion 38 as well as throughout the bight portion. The free ends of the leg portions 40 are of reduced width, as indicated at 46 in FIG. 2, so as to engage within the free end portions 36 of the tubular member 18. In this way, the tubular member 18 and U-shaped blade 20 cooperate together to form an annular structure which has great strength and durability characteristics.

Figure 2:
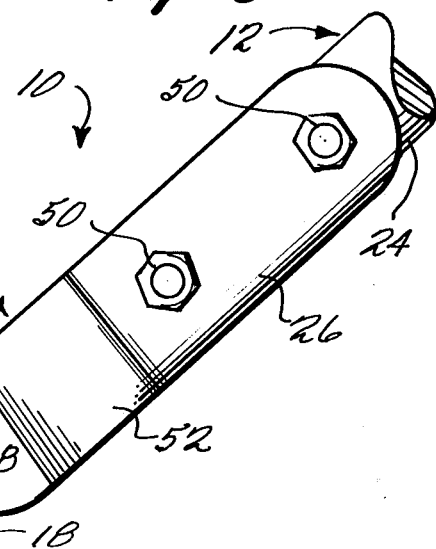
FIG. 2 is an enlarged fragmentary side elevational view of the tool shown in FIG. 1 with parts broken away for the purpose of clearer illustration.

The articulated connection between the handle attaching elements 14 and 16 and the tubular member 18 is effected by simply providing openings 48 within the portions 28 of the attaching elements. As best shown in FIG. 2, the openings 48 are of a size larger than the exterior peripheral size of the flattened portions of the tubular member 18. This relationship and the fact that the attaching elements are separate from one another enables the opposed flattened end portions of the tubular member to be inserted through the openings 48 in the respective attaching elements 14 and 16. In the final assembled position, the straight flattened portions 32 inwardly of the bends 34 are received within the openings 48 so that the second portions 28 of the attaching elements are disposed on opposite sides of the central tubular portion 30.

It will be understood that in the normal operative position of the tool 10, the double edged bight portion of the blade 20 is disposed in a generally horizontal position with the leg portions 40 extending generally upwardly therefrom. In order to orient the handle 12 in a favorable operative gripping position, the second portions 28 and openings 48 therein extend longitudinally at an angle of approximately 40° with respect to the longitudinal extent of the first portions of the attaching elements. The first portions 26 are preferably bent transversely into an arcuate or concavo-convex cross-sectional configuration so that the concave sides thereof will engage and conform with opposed exterior peripheral sides of the handle end portion 24.

Any suitable means may be utilized to affix the first portions 26 of the attaching elements 14 and 16 to the handle. As shown, a pair of bolt assemblies 50 are utilized which extend through registering parallel apertures in the first portions 26 and handle end portions 24.

In order to provide a good measure of lateral stability to the articulated connection between the attaching elements 14 and 16 and the tubular member 18, the central portion 30 is formed with a longitudinal extent greater than the diameter of the handle. To accommodate these differing dimensions, the handle attaching elements are formed with intermediate angularly extending portions 52. Moreover, the interior shape of openings 48 with respect to the exterior shape of the flattened portions 32 is such as to provide an articulated movement between the handle 12 and blade 20 of the type heretofore known and variously referred to in the prior art as a pendulum movement, a tilting movement, or a swinging movement. Irrespective of the term utilized to describe the movement, its essence is that the blade will assume a more desirable transverse angle of approach through the ground by virtue of the articulating movement provided regardless of whether the blade is being pushed or pulled without the necessity of the operator making a manual adjustment as the direction of movement is changed between a push and a pull.

Figure 3:
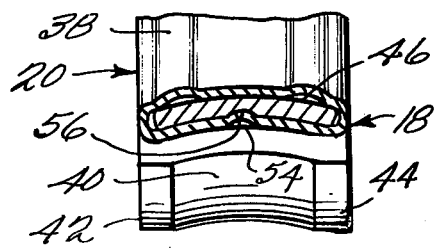
FIG. 3 is an enlarged fragmentary sectional view taken along the line 3—3 of FIG. 2.

It is important to note that this desirable movement between the handle and the blade is provided in the present invention by three components which are disposed in intervening relation between the handle and blade, which three components are, in and of themselves, strong, durable, and capable of economical fabrication. Moreover, these three intervening components facilitate simple and economical assembly of the total combination of components including the handle and blade. Furthermore, the final assembled relationship serves to augment the strength and durability characteristics of the blade per se by making it an assembled part of a complete annular structure. In this regard, a preferred manner of completing the assembly of the free ends of the leg portions of the blade 20 within the free end portions of the tubular member 18 is to crimp the portions together after they have been disposed in interengaged relation as best shown in FIG. 3. Such crimping may include the deformation of a dome-shaped projection 54 in the exterior wall of each tubular member end portion 36 into a cooperatively shaped depression 56 in each blade free end portion 46.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A cultivator of the type described comprising:
    an elongated handle having a manually engageable end portion and an opposite end portion,
    a tubular member having spaced opposite end portions thereof flattened, said flattened end portions having similar intermediately disposed transverse bends formed therein,
    a pair of separate handle attaching elements including first portions fixed to the opposite end portion of said handle in opposed relation thereto and second portions having openings therein receiving therethrough the flattened end portions of said tube inwardly of the bends therein,
    a U-shaped blade having a generally straight double edged bight portion disposed generally horizontally in operation and leg portions which extend transversely from the ends of said bight portion in a generally upward direction in operation, and
    means for securing the free ends of said leg portions within the flattened end portions of said tube outwardly of the bends therein,
    said openings having an interior cross-sectional configuration of a size larger than the exterior cross-sectional configuration of the flattened end portions extending therethrough and of a shape relative thereto operable to provide a limited tilting movement of said tubular member and U-shaped blade with respect to said handle and said handle attaching elements in a direction normal to the straight double edged bight portion of said blade.

2. A cultivator as defined in claim 1 wherein said handle attaching elements are formed of strap metal, said first portions extending longitudinally along opposite sides of the opposite end portion of said handle, said handle attaching elements including integral intermediate portions extending angularly between said first and second portions, said second portions being in parallel relation with one another outwardly of said first portions on opposite sides thereof.

3. A cultivator as defined in claim 2 wherein said second portions extend longitudinally at an angle of approximately 40° with respect to longitudinal extent of said first portions, each of said first portions being bent transverse to the longitudinal extent thereof into an arcuate configuration conforming to the associated exterior periphery of the associated side of the opposite end of said handle.

4. A cultivator as defined in claim 3 wherein said handle attaching elements are fixed to said handle by a pair of bolt assemblies passing through the first portions of said handle attaching elements and the opposite end portion of said handle.

5. A cultivator as defined in claim 1 wherein said securing means for each leg portion free end and associated tubular member flattened end portion comprises a projection within a wall of the associated flattened end portion crimped into a corresponding depression in the associated leg portion free end.

6. A cultivator as defined in claim 1 wherein said blade is of uniform width between the free ends of the leg portions thereof, the free ends of said leg portion having a reduced width.

7. A cultivator as defined in claim 1 wherein the ends of said leg portions adjacent said bight portion have opposed double cutting edges forming a continuation of the opposed double cutting edges of said bight portion.

8. A cultivator as defined in claim 1 wherein the U-shaped blade is of concavo-convex cross-sectional configuration, the concave side of said bight portion facing downwardly when in operative position.

9. A cultivator as defined in claim 8 wherein the opposed double cutting edges of said bight portion are formed by grinding opposed concave portions along a common plane.

* * * * *